US012658331B2

(12) United States Patent
Camp et al.

(10) Patent No.: US 12,658,331 B2
(45) Date of Patent: Jun. 16, 2026

(54) NUCLEAR REACTOR AND METHOD OF OPENING A NUCLEAR REACTOR

(71) Applicant: Rolls-Royce SMR Limited, Derby (GB)

(72) Inventors: Nicholas Camp, Derby (GB); Andrew Knight, Derby (GB)

(73) Assignee: ROLLS-ROYCE SMR LIMITED, Derby (GB)

( * ) Notice: Subject to any disclaimer, the term of this patent is extended or adjusted under 35 U.S.C. 154(b) by 420 days.

(21) Appl. No.: 18/016,250

(22) PCT Filed: Jul. 14, 2021

(86) PCT No.: PCT/EP2021/069594
§ 371 (c)(1),
(2) Date: Jan. 13, 2023

(87) PCT Pub. No.: WO2022/017884
PCT Pub. Date: Jan. 27, 2022

(65) Prior Publication Data

US 2023/0268088 A1 Aug. 24, 2023

(30) Foreign Application Priority Data

Jul. 21, 2020 (GB) ...................................... 2011236

(51) Int. Cl.
*G21C 9/02* (2006.01)
*G21C 7/14* (2006.01)
(Continued)

(52) U.S. Cl.
CPC ................. *G21C 9/02* (2013.01); *G21C 7/14* (2013.01); *G21C 15/182* (2013.01); *G21C 7/12* (2013.01)

(58) Field of Classification Search
CPC .... G21C 17/10; G21C 17/104; G21C 17/108; G21C 9/02
See application file for complete search history.

(56) References Cited

U.S. PATENT DOCUMENTS

| | | | | |
|---|---|---|---|---|
| 3,188,470 A * | 6/1965 | Ricker | G21C 17/10 | 250/391 |
| 4,110,157 A * | 8/1978 | Jabsen | G21C 7/12 | 376/233 |

(Continued)

FOREIGN PATENT DOCUMENTS

| | | | |
|---|---|---|---|
| DE | 19960655 A1 * | 7/2001 | G21C 17/003 |
| GB | 2508815 A | 6/2014 | |
| WO | WO-2013023437 A1 * | 2/2013 | G21C 7/12 |

OTHER PUBLICATIONS

International Search Report and Written Opinion, International Application No. PCT/EP2021/069594, International Searching Authority, dated Oct. 15, 2021, 12 pages.

(Continued)

*Primary Examiner* — Lily C Garner
(74) *Attorney, Agent, or Firm* — Quarles & Brady LLP

(57) ABSTRACT

A nuclear reactor includes a reactor pressure vessel housing plural fuel rods, the reactor pressure vessel having a vessel head. The reactor includes control rods. The control rods are inserted into the reactor between the fuel rods. The control rods are movable to control the power output of the reactor when it is critical, to generate power, and to put the reactor in a shutdown state. The reactor includes control rod drive mechanisms to move the control rods. The control rod drive mechanisms are controllable to release the control rods when a vessel opening operation is performed when the reactor is in the shutdown state and the vessel head is lifted upwards from the reactor pressure vessel so the control rods slide therethrough to remain stationary relative to the fuel (Continued)

rods. The reactor has a monitoring unit to identify whether a control rod is lifting with the vessel head.

18 Claims, 2 Drawing Sheets

(51) Int. Cl.
*G21C 15/18* (2006.01)
*G21C 7/12* (2006.01)

(56) References Cited

U.S. PATENT DOCUMENTS

| | | | | |
|---|---|---|---|---|
| 4,818,476 | A * | 4/1989 | Gasparro | G21C 13/06 376/205 |
| 5,524,030 | A * | 6/1996 | White | G21C 7/16 376/217 |
| 5,661,771 | A * | 8/1997 | Sridhar | G21C 7/16 210/232 |
| 5,761,260 | A * | 6/1998 | Bergamaschi | G21C 7/12 376/233 |
| 5,841,824 | A * | 11/1998 | Graham | G21C 17/00 376/258 |
| 10,497,482 | B2 * | 12/2019 | Keller | G21C 13/02 |
| 11,145,423 | B2 * | 10/2021 | Sakakura | F28F 3/08 |
| 11,901,088 | B2 * | 2/2024 | Singh | G21C 15/243 |
| 2006/0149515 | A1 * | 7/2006 | Horton | G21C 7/36 703/6 |
| 2010/0067644 | A1 * | 3/2010 | D'Auvergne | G21C 3/30 376/294 |
| 2013/0335181 | A1 * | 12/2013 | Choi | H01F 41/127 336/96 |
| 2015/0310942 | A1 * | 10/2015 | Bunce | G21C 7/16 376/233 |
| 2023/0162874 | A1 * | 5/2023 | Robertson | G21C 7/06 376/219 |

OTHER PUBLICATIONS

Intellectual Property Office, GB Application No. GB2011236.3, dated Feb. 1, 2021, 3 pages.

* cited by examiner

NUCLEAR REACTOR AND METHOD OF OPENING A NUCLEAR REACTOR

RELATED APPLICATIONS

This application is a 35 U.S.C. § 371 national phase application of PCT/EP2021/069594 (WO2022/017884-A1), filed on Jul. 14, 2021, entitled "NUCLEAR REACTOR AND METHOD OF OPENING A NUCLEAR REACTOR", and claims priority to GB-2011236.3 filed on Jul. 21, 2020, which are incorporated herein by reference in their entirety.

FIELD

The present disclosure relates to a nuclear reactor and a method of opening a nuclear reactor.

BACKGROUND

Nuclear power plants convert heat energy from the nuclear decay of fissile material contained in fuel assemblies into electrical energy. Pressurised water reactor (PWR) nuclear power plants have a primary coolant circuit which typically connects the following pressurised components: a reactor pressure vessel (RPV) containing the fuel assemblies; one or more steam generators; and one or more pressurizers. Coolant pumps in the primary circuit circulate pressurised water through pipework between these components. The RPV houses the nuclear reactor which heats the water in the primary circuit. The steam generator functions as a heat exchanger between the primary circuit and a secondary system where steam is generated to power turbines. The pressurizers maintain pressure of around 155 bar in the primary circuit.

The fuel assemblies contain fuel rods, formed of sintered pellets of fissile material. The fuel assemblies also include space for control rods. For example, a conventional fuel assembly provides a housing for a 17×17 grid of rods i.e. 289 total spaces. Of these 289 total spaces, 24 may be reserved for control rods, and one may be reserved for an instrumentation tube. The control rods are movable in and out of the reactor by control rod drive mechanisms located on the head of the reactor pressure vessel to provide real-time control of the fission process undergone by the fuel, by absorbing neutrons released during nuclear fission. A typical reactor would include some 100-300 fuel assemblies. Fully inserting the control rods typically leads to a subcritical state in which the reactor is shutdown.

In some reactors the head of the reactor pressure vessel and its associated assembly, including the control rod drive mechanisms are integrated into a single unit together referred to as the reactor head package. The reactor head package needs to be removed to refuel the reactor or to relocate fuel rods within the reactor.

Conventionally, to lift a head package control rods are lowered into the reactor, to reduce the criticality of the reactor. After the vessel head studs joining the head package to the reactor body have been unscrewed and removed, and power and monitoring cables disconnected from the head package, the reactor head package is lifted, typically by a crane. However, it is important that a shutdown high safety margin is maintained in case control rods are inadvertently removed, or any other accident occurs which has the potential to degrade the shutdown margin. In particular, during the lift of the reactor head package, there is potential for a drive rod to become stuck in a control rod drive mechanism and withdraw a control rod with it.

Therefore, a conventional approach has been to "flood up" the reactor by submerging it in a depth of water (the primary circuit coolant) and to introduce or increase the concentration of a neutron poison such as soluble boric acid solution in the water to allow "poisoned" coolant to circulate within the reactor. This coolant is poisoned in the sense that it has a very high neutron capture cross-section, and so starves the fissile material of neutrons to trigger another fission event.

Undesirably, boric acid is highly toxic, corrosive and the use of poisons increases the complexity of reactor operation and design. It would be preferable then to provide the necessary safety margin in a way which does not require the use of boric acid.

SUMMARY

Accordingly, in a first aspect, the present disclosure provides a nuclear reactor including:

- a reactor pressure vessel housing plural fuel rods containing fissile material, the reactor pressure vessel having an upper, removable, vessel head;
- control rods, each made of a neutron-absorbing material, the control rods being inserted into the reactor through the vessel head and between the fuel rods to control the rate of the fuel rods' fission reaction, whereby the control rods are movable over a normal range of insertion positions relative to the vessel head to control the power output of the reactor when it is critical and generating useful power, and to put the reactor in a sub-critical shutdown state; and
- control rod drive mechanisms carried by the vessel head and operable to drive the movements of the control rods;
- wherein the control rod drive mechanisms are controllable to release the control rods when a vessel opening operation is performed in which the reactor is in the shutdown state and the vessel head is lifted upwards from the reactor pressure vessel such that the control rods slide therethrough to remain stationary relative to the fuel rods to maintain the shutdown state; and
- wherein the reactor further has a monitoring unit(s) to identify whether a control rod is accidentally lifting with the vessel head.

Thus the monitoring unit allows a stuck control rod (i.e. one which is lifting with the vessel head) to be identified in the lifting process and can thereby prevent excessive rod withdrawal which could lead to an undesirable fissile reactivity addition (i.e. reduced shutdown safety margin). In this way, the reactor can be safely opened without having to poison the reactor coolant (e.g. by introducing boric acid solution).

In addition, the monitoring unit can help to avoid damage which stuck rods can cause to control rod drive mechanisms and other components.

Optional features of the nuclear reactor of the first aspect will now be set out. These are applicable singly or in any combination.

The monitoring unit(s) may comprise any of: a plurality of position sensors; one or more neutron sensors; and/or one or more load sensors.

The monitoring unit may include position sensors which detect the position of the control rods relative to the vessel head over the normal range of insertion positions, and which further detect the positions of the control rods relative to the vessel head over an additional range of insertion positions beyond the normal range when the vessel head is lifted during the vessel opening operation and the control rods slide therethrough to identify whether a control rod is accidentally lifting with the vessel head. For example, each position sensor may be formed by a row of induction coils which detect the local presence or absence of a respective control rod. Advantageously, the position sensors can reveal the identity of a stuck rod.

The position sensors may be located adjacent to the control rod drive mechanism, below the control rod drive mechanism; or integrated therein.

Additionally, or alternatively, the monitoring unit may include a load sensor which measures the weight of the reactor head package to identify whether a control rod is accidentally lifting with the vessel head.

The load sensor(s) may be integrated into any of: a crane head; the lifting point(s) of the reactor head package; the connection between the reactor head package and the crane; or between the reactor pressure vessel head and the control rod drive mechanisms. In another embodiment, each of the control rod drive mechanisms may be mounted onto the reactor vessel head through a load sensor. Thus allowing the location of a stuck control rod to be identified by identifying the location of the load sensor recording an increase of expected mass.

The load sensor may comprise one or more load cells.

Additionally or alternatively, the monitoring unit may include a neutron sensor which measures neutron population to identify whether a control rod is accidentally lifting with the vessel head.

The neutron sensor(s) may be positioned on or in the reactor head or reactor body, or may be mounted external thereto. In particular, the neutron sensor(s) may be positioned at, close to, or above the height of the flange between the reactor vessel and the reactor head. The neutron sensor(s) may be mounted at the top of the internal housings which contain the individual fuel rods. A plurality of neutron sensors may be used (e.g. around the perimeter of the reactor vessel, or at the top of each housing) and the relative intensity of neutrons detected by each sensor may be used to approximate the location of a stuck rod during lifting.

The neutron sensor may comprise one or more of: a scintillation neutron detector; a gas proportional detector; and/or a semiconductor neutron detector.

Thus, the monitoring unit may include any one, any two or all three of the position sensors, load sensor(s) and neutron sensor(s). Having two, and preferably three, independent ways to identify whether a control rod is accidentally lifting with the vessel head, enhances reactor operational safety.

The nuclear reactor may further include a control system (e.g. a computer-based control system) which is programmed to control the vessel opening operation, the control system commanding termination of the vessel opening operation (e.g. return of the vessel head to the reactor pressure vessel) if it receives from the monitoring unit an indication that a control rod is accidentally lifting with the head. In this way the termination action can be automated.

Conveniently, when the monitoring system includes the position sensors, the control system may be further programmed to compare a rate of lift of the vessel head with the rates of change of the detected positions of the control rods relative to the head to identify from the detected positions a control rod which is accidentally lifting with the head. Typically, the control system includes an output device, such as a monitor or printer, which returns the location of a control rod identified as lifting with the head.

When the monitoring system includes the load sensor, the control system may be further programmed to compare the measured weight with a value of an expected weight of the reactor head package to identify from the measured weight whether a control rod is accidentally lifting with the head.

When the monitoring system includes the neutron sensor, the control system may be further programmed to compare the measured neutron population with a predetermined population level and/or to compare a rate of increase of the measured neutron population with a predetermined rate of increase to identify from the measured neutron population whether a control rod is accidentally lifting with the head.

The reactor may further have at least one cable umbilical which remains attached to the vessel head during the vessel opening operation to provide power and a communication pathway to the monitoring unit. Alternatively, power may be provided by battery and a communication pathway may be provided wirelessly.

The vessel head, control rod drive mechanism and any other components of the reactor lifted with the head form a reactor head package.

In a second aspect, the present disclosure provides a method of opening a pressure vessel of a nuclear reactor;

wherein the reactor pressure vessel houses fuel rods containing fissile material and has an upper, removable, vessel head; wherein the reactor includes control rods, each made of a neutron-absorbing material, the control rods being inserted into the reactor through the vessel head and between the fuel rods to control the rate of the fuel rods' fission reaction, whereby the control rods are movable over a normal range of insertion positions relative to the vessel head to control the power output of the reactor when it is critical and generating useful power, and to put the reactor in a sub-critical shutdown state; and wherein the reactor further includes control rod drive mechanisms carried by the vessel head and operable to drive the movements of the control rods;

the method including steps of:

using the control rod drive mechanisms to move the control rods to an insertion position in which the reactor is in the shutdown state;

releasing the control rods from the control rod drive mechanisms;

lifting the vessel head upwards from the reactor pressure vessel such that the control rods slide therethrough to remain stationary relative to the fuel rods to maintain the shutdown state;

monitoring for whether a control rod is accidentally lifting with the vessel head during the lifting of the head to open the pressure vessel; and terminating the lifting of the vessel head if a control rod is monitored to be accidentally lifting with the head.

Thus the nuclear reactor used in the method of the second aspect can be the nuclear reactor of the first aspect.

Optional features of the method of the second aspect will now be set out. These are applicable singly or in any combination.

The terminating step may include returning the vessel head to the reactor pressure vessel if a control rod is monitored to be accidentally lifting with the head.

The monitoring step may include detecting the positions of the control rods relative to the vessel head, and comparing a rate of lift of the vessel head with the rates of change of the detected positions of the control rods relative to the head to identify from the detected positions a control rod which is accidentally lifting with the head. The method may then further include a step of: returning the location of a control rod identified as lifting with the head.

Additionally or alternatively, the monitoring step may include measuring the weight of the reactor head package to identify whether a control rod is accidentally lifting with the vessel head. For example, the method may further include a step of: comparing the measured weight with a value of an expected weight of the reactor head package to identify from the measured weight whether a control rod is accidentally lifting with the head.

Additionally or alternatively, the monitoring step may include measuring neutron population to identify whether a control rod is accidentally lifting with the vessel head. For example, the method may further include a step of: comparing the measured neutron population with a predetermined population level and/or a rate of increase of the measured neutron population with a predetermined rate of increase to identify from the measured neutron population whether a control rod is accidentally lifting with the head.

The present invention may comprise or be comprised as part of a nuclear reactor power plant (referred to herein as a nuclear reactor). In particular, the present invention may relate to a Pressurized water reactor. The nuclear reactor power plant may have a power output between 250 and 600 MW or between 300 and 550 MW.

The nuclear reactor power plant may be a modular reactor. A modular reactor may be considered as a reactor comprised of a number of modules that are manufactured off site (e.g. in a factory) and then the modules are assembled into a nuclear reactor power plant on site by connecting the modules together. Any of the primary, secondary and/or tertiary circuits may be formed in a modular construction.

The nuclear reactor of the present disclosure may comprise a primary circuit comprising a reactor pressure vessel; one or more steam generators and one or more pressurizer. The primary circuit circulates a medium (e.g. water) through the reactor pressure vessel to extract heat generated by nuclear fission in the core, the heat is then to delivered to the steam generators and transferred to the secondary circuit. The primary circuit may comprise between one and six steam generators; or between two and four steam generators; or may comprise three steam generators; or a range of any of the aforesaid numerical values. The primary circuit may comprise one; two; or more than two pressurizers. The primary circuit may comprise a circuit extending from the reactor pressure vessel to each of the steam generators, the circuits may carry hot medium to the steam generator from the reactor pressure vessel, and carry cooled medium from the steam generators back to the reactor pressure vessel. The medium may be circulated by one or more pumps. In some embodiments, the primary circuit may comprise one or two pumps per steam generator in the primary circuit.

In some embodiments, the medium circulated in the primary circuit may comprise water. In some embodiments, the medium may comprise a neutron absorbing substance added to the medium (e.g., boron, gadolinium). In some embodiments the pressure in the primary circuit may be at least 50, 80 100 or 150 bar during full power operations, and pressure may reach 80, 100, 150 or 180 bar during full power operations. In some embodiments, where water is the medium of the primary circuit, the heated water temperature of water leaving the reactor pressure vessel may be between 540 and 670 K, or between 560 and 650 K, or between 580 and 630 K during full power operations. In some embodiments, where water is the medium of the primary circuit, the cooled water temperature of water returning to the reactor pressure vessel may be between 510 and 600 k, or between 530 and 580 K during full power operations.

The nuclear reactor of the present disclosure may comprise a secondary circuit comprising circulating loops of water which extract heat from the primary circuit in the steam generators to convert water to steam to drive turbines. In embodiments, the secondary loop may comprise one or two high pressure turbines and one or two low pressure turbines.

The secondary circuit may comprise a heat exchanger to condense steam to water as it is returned to the steam generator. The heat exchanger may be connected to a tertiary loop which may comprise a large body of water to act as a heat sink.

The reactor vessel may comprise a steel pressure vessel, the pressure vessel may be from 5 to 15 m high, or from 9.5 to 11.5 m high and the diameter may be between 2 and 7 m, or between 3 and 6 m, or between 4 to 5 m. The pressure vessel may comprise a reactor body and a reactor head positioned vertically above the reactor body. The reactor head may be connected to the reactor body by a series of studs that pass through a flange on the reactor head and a corresponding flange on the reactor body.

The reactor head may comprise an integrated head assembly in which a number of elements of the reactor structure may be consolidated into a single element. Included among the consolidated elements are a pressure vessel head, a cooling shroud, control rod drive mechanisms, a missile shield, a lifting rig, a hoist assembly, and a cable tray assembly.

Movement of the control rod may be moved by a control rod drive mechanism. The control rod drive mechanism may command and power actuators to lower and raise the control rods in and out of the fuel assembly, and to hold the position of the control rods relative to the core. The control rod drive mechanism rods may be able to rapidly insert the control rods to quickly shut down (i.e. scram) the reactor.

The primary circuit may be housed within a containment structure to retain steam from the primary circuit in the event of an accident. The containment may be between 15 and 60 m in diameter, or between 30 and 50 m in diameter. The containment structure may be formed from steel or concrete, or concrete lined with steel. The containment may house one or more lifting devices (e.g. a polar crane). The lifting device may be housed in the top of the containment above the reactor pressure vessel. The containment may contain within or support exterior to, a water tank for emergency cooling of the reactor. The containment may contain equipment and facilities to allow for refuelling of the reactor, for the storage of fuel assemblies and transportation of fuel assemblies between the inside and outside of the containment.

The power plant may contain one or more civil structures to protect reactor elements from external hazards (e.g. missile strike) and natural hazards (e.g. tsunami). The civil structures may be made from steel, or concrete, or a combination of both.

DETAILED DESCRIPTION

Figure 1:
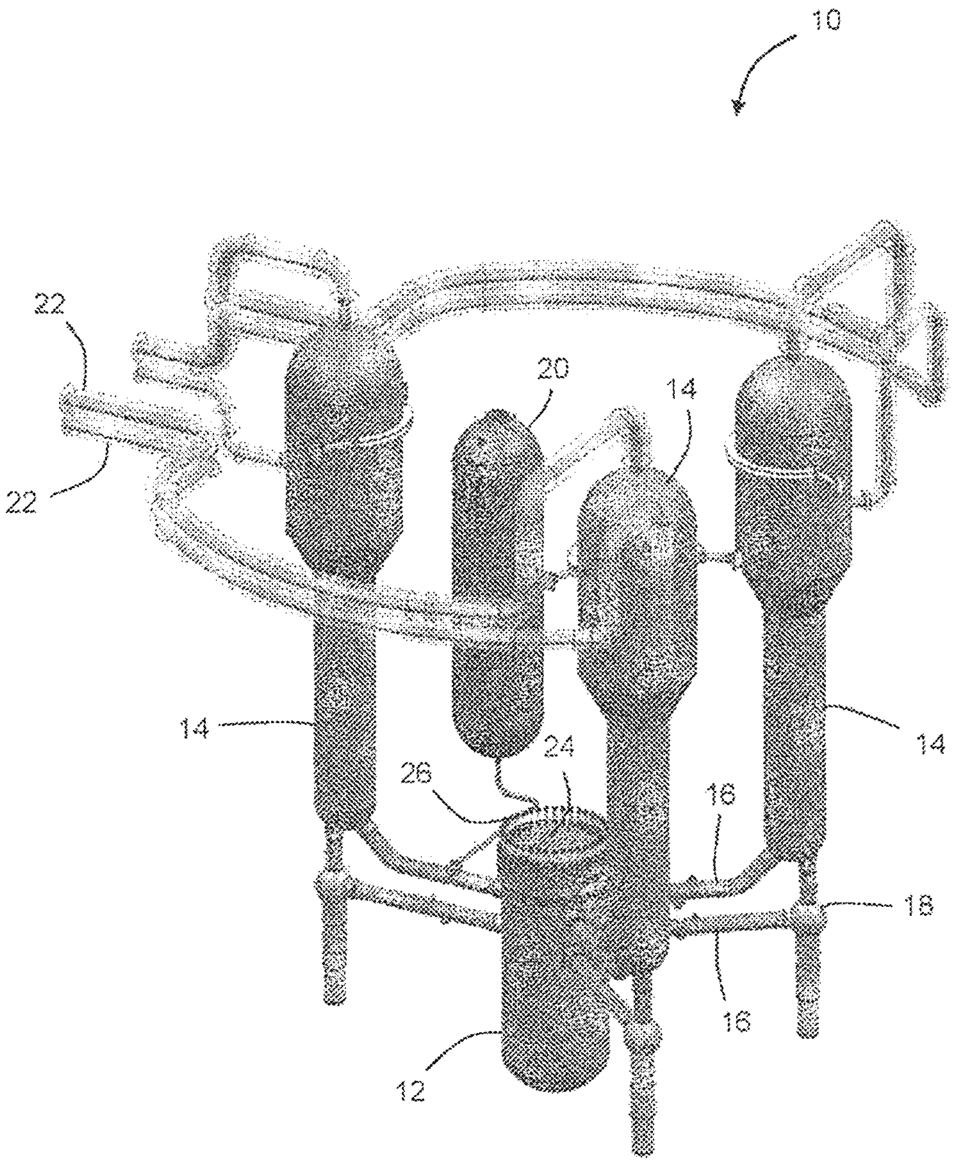
Fig. 1 (Prior Art)
FIG. 1 is a schematic diagram of a PWR nuclear power plant.
Figure 2:
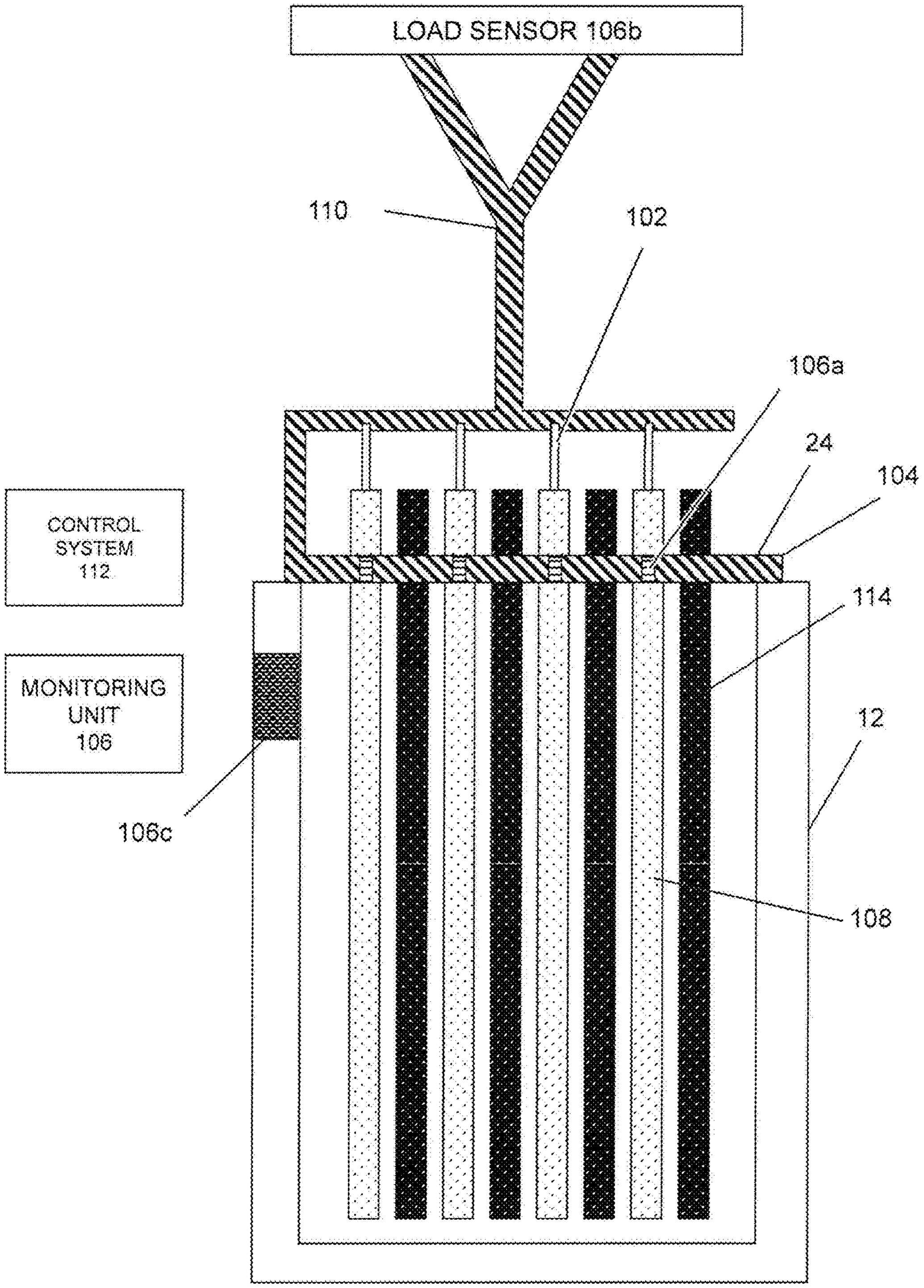
FIG. 2 is a schematic cross-sectional view of the RPV of the PWR nuclear power plant of FIG. 1.

Embodiments will now be described by way of example only, with reference to FIG. 1, which is a schematic diagram of a PWR nuclear power plant 10.

An RPV 12 containing fuel assemblies is centrally located in the plant 10. Clustered around the RPV are three steam generators 14 connected to the RPV by pipework 16 of the pressurised water, primary coolant circuit. Coolant pumps 18 circulate pressurised water around the primary coolant circuit, taking heated water from the RPV to the steam generators, and cooled water from the steam generators to the RPV.

A pressurizer 20 maintains the water pressure in the primary coolant circuit at about 155 bar.

In the steam generators 14, heat exchangers transfer heat from the pressurised water to feed water circulating in pipework 22 of a secondary coolant circuit, thereby producing steam which is used to drive turbines which in turn drive an electricity-generator. The steam is then condensed before returning to the steam generators.

In one arrangement of the plant 10, each of the RPV 12, steam generators 14 and pressurizer 20 is contained in a respective pressure-containing silo. This makes each silo significantly smaller and easier to fabricate than a conventional containment building for the whole plant. Alternatively, the RPV 12, steam generators 14 and pressurizer 20 may be contained in a single pressure containing silo.

The RPV has fuel rods 114 containing fissile material. The RPV 12 has an upper, removable, vessel head 24 fixed in place on the vessel with head studs 26, and control rods 108 inserted into the RPV 12 through the vessel head and movable over a normal range of insertion positions relative to the vessel head to control the power output of the reactor when it is critical and generating useful power, and to put the reactor in a sub-critical shutdown state. This movement is actuated by control rod drive mechanisms 102 located on the vessel head 24, the control rod drive mechanisms 102 forming, with the vessel head 24 and other equipment items, a reactor head package 104.

Associated with the control rod drive mechanisms 102 are rod position indicators 106 which are typically in the form of rows of induction loop position sensors distributed along the channels in which the control rods 108 reside. These sensors allow the range of insertion positions of the control rods 108 in normal operation of the reactor to be monitored. However, the sensors are configured so that they also form part of a monitoring system to monitor for stuck control rods 108 during an opening operation of the RPV 12 (e.g. for refuelling).

More particularly, to open the RPV 12, the control rods 108 are first fully inserted to put the reactor in a sub-critical shutdown state. The head studs 26 of the vessel head 24 are unscrewed and removed, and power and monitoring cables for the reactor head package 104 are disconnected, except for at least one cable umbilical which provides power and communication pathway for the rod position indicators so that they remain connected and active. This umbilical may be coiled or concertinaed to accommodate lifting and repositioning of the reactor head package 104.

The reactor head package 104 can then be lifted by crane 110. As the head package is lifted, the drive rods should remain stationary relative to the fuel assemblies and the rod position indicators should move upwards. Hence, the tops of the drive rods should appear to move down. This downwards movement is monitored by the position indicators whose rows of induction loop position sensors 106 can be extended to detect the additional range of movement of the rods. Conversely, a rod which is stuck in its drive mechanism 102 and lifting with the head package 104 will appear to have no such movement. Accordingly, even after a small distance of lift, the difference in positions between non-stuck rods and a stuck rod allow a stuck rod to be identified. Another option is to compare the rates of apparent movement of the rods with rate of lift applied by the crane; non-stuck rods will appear to move at the same rate (although in the opposite direction) as the rate of lift, while stuck rods will show a different (typically zero) rate of movement.

This approach allows a stuck rod to be identified early during the lift and thereby prevent excessive rod withdrawal leading to an undesirable reactivity addition. As each rod can have its own rod position indicator, the position of a stuck rod can be readily identified by the plant operator and remedial action taken. This in turn enhances the viability of operating the reactor without using soluble boron, which would otherwise have been required to provide sufficient margin of neutron absorption were a rod to have been accidentally lifted clear of the fuel assembly.

Fuel assembles typically incorporate several centimetres of low-fissile material construction at their bases, which provides a “safe zone” at the bottom of the RPV 12. If the control rods are inadvertently lifted out of this safe zone region (but not beyond), no significant neutron population increase should occur. Thus an initial “proving” lift restricted to this safe zone can be used to confirm the presence of inadvertent control rod lifting such that safety limits are not violated and high levels of safety are provided in an environment free of soluble boron.

The plant can have a computer-based control system programmed 112 to control the opening operation. Such a system can swiftly and automatically command termination of the vessel opening operation, e.g. by returning the vessel head back to the reactor, if it identifies from the monitored positions a control rod which is lifting with the head package. It can also return the location of the stuck rod to a suitable output device. In addition, the system can be programed to e.g. compare the rate of lift of the vessel head with the rates of change of the detected positions of the control rods relative to the head, or identify any differences in detected positions, so that a control rod which is accidentally lifting with the head can be identified.

Another option, which can be implemented in place of but preferably is in addition to the rod position indicators, is for the monitoring system for stuck control rods to include a load sensor that measures the weight of the reactor head package. In particular, the mass of the head package is a known quantity, and if a control rod is inadvertently lifted with the package its apparent mass will read higher than the known quantity.

Thus the computer-based control system can be linked to a lift controller of the crane. If a crane payload is sensed which is beyond the known head package mass, the control system determines that a control rod is accidentally lifting with the vessel head and overrides the crane controller to terminate the lift.

Yet another option, which can be implemented in place of but preferably is in addition to either or both of the rod position indicators 106*a* and the load sensor 106*b*, is for the monitoring system for stuck control rods to include a neutron sensor 106*c* which measures neutron population of the reactor core. This can then be used by the control system to determine if the population is increasing, decreasing or stable to identify whether a control rod is accidentally lifting with the vessel head.

The computer-based control system 112 may analyse the input from each of the sensors in the sensing unit to determine a location of a stuck fuel rod (i.e. which control rod drive mechanism in the head package is lifting the control rod). Determining a location of a stuck fuel rod may comprise identifying a signal from a sensor for which the signal identifies a stuck control rod. Consulting a data file which associates each sensor with a location; outputting to a user the location within the reactor head or fuel assembly associated with that particular sensor.

When the reactor is critical and generating useful power such a neutron sensor 106*c* can be used by the reactor control systems to cause a "scram", in which the control rods are inserted into the core thereby rapidly terminating the fission reactions if the sensed neutron population is too high or increasing at too fast a rate. In the present monitoring system, however, detection by the neutron sensor of a rising population (e.g. above a predetermined level and/or rate of increase) can be indicative of a stuck control rod and thus may be used by the control system to override the crane controller and terminate the lift.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A nuclear reactor including:

a reactor pressure vessel housing plural fuel rods containing fissile material, the reactor pressure vessel having an upper, removable, vessel head;

control rods, each made of a neutron-absorbing material, the control rods being inserted into the reactor through the vessel head and between the fuel rods to control a rate of a fuel rods' fission reaction, whereby the control rods are movable over a first range of insertion positions relative to the vessel head to control a power output of the reactor when it is critical, to generate power, and to put the reactor in a sub-critical shutdown state; and control rod drive mechanisms carried by the vessel head and operable to drive movements of the control rods;

wherein the control rod drive mechanisms are controllable to release the control rods when a vessel opening operation is performed when the reactor is in the shutdown state and the vessel head is lifted upwards from the reactor pressure vessel such that the control rods slide therethrough to remain stationary relative to the fuel rods to maintain the shutdown state;

wherein the reactor further comprises a monitoring unit to identify whether at least one control rod of the control rods is lifted with the vessel head and a control system, linked to the monitoring unt, and configured to terminate a lift of the vessel head during the vessel opening operation when the monitoring unit identifies the at least one control rod is being lifted with the vessel head.

2. The nuclear reactor according to claim 1, wherein the monitoring unit comprises any of: a plurality of position sensors; one or more neutron sensors; and one or more load sensors.

3. The nuclear reactor according to claim 2, wherein the monitoring unit includes:

the plurality of position sensors which detect the position of the control rods relative to the vessel head over the first range of insertion positions, and which further detect the positions of the control rods relative to the vessel head when the vessel head is lifted during the vessel opening operation and the control rods slide through the vessel head to identify whether the at least one control rod is lifted with the vessel head.

4. The nuclear reactor according to claim 3, wherein the control system is configured to control the vessel opening operation.

5. The nuclear reactor according to claim 2, wherein the monitoring unit includes the plurality of position sensors and each position sensor is formed by a row of induction coils which detect a local presence or an absence of a respective control rod.

6. The nuclear reactor according to claim 1, wherein the vessel head and any other components of the reactor lifted with the head form a reactor head package, and wherein the monitoring unit includes a load sensor which measures a weight of the reactor head package to identify whether the at least one control rod is lifted with the vessel head.

7. The nuclear reactor according to claim 6, wherein the control system is configured to control the vessel opening operation.

8. The nuclear reactor according to claim 7, wherein the control system is further programmed to compare the measured weight with a value of an expected weight of the reactor head package to identify from the measured weight whether the at least one control rod is lifted with the head.

9. The nuclear reactor according to claim 1, wherein the monitoring unit includes a neutron sensor which measures neutron population to identify whether the at least one control rod is lifted with the vessel head.

10. The nuclear reactor according to claim 9, wherein the control system is configured to control the vessel opening operation.

11. The nuclear reactor according to claim 10, wherein the control system is further programmed to compare the measured neutron population with a predetermined population level and/or to compare a rate of increase of the measured neutron population with a predetermined rate of increase to identify from the measured neutron population whether a control rod is lifted with the head.

12. The nuclear reactor according to claim 1, further including a control system which is programmed to control the vessel opening operation, the control system commanding termination of the vessel opening operation if it receives from the monitoring unit an indication that the at least one control rod is lifted with the head.

13. The nuclear reactor according to claim 12, wherein the control system returns the vessel head to the reactor pressure vessel if it receives from the monitoring unit an indication that the at least one control rod is lifted with the head.

14. A method of opening a pressure vessel of a nuclear reactor;

wherein the reactor pressure vessel houses fuel rods containing fissile material and has an upper, removable, vessel head; wherein the reactor includes control rods, each made of a neutron-absorbing material, the control rods being inserted into the reactor through the vessel head and between the fuel rods to control a rate of a fuel rods' fission reaction, whereby the control rods are movable over a first range of insertion positions relative to the vessel head to control a power output of the reactor when it is critical and generating power, and to put the reactor in a sub-critical shutdown state; and wherein the reactor further includes control rod drive mechanisms carried by the vessel head and operable to drive movements of the control rods;

the method including steps of:

using the control rod drive mechanisms to move the control rods to an insertion position in which the reactor is in the shutdown state;

releasing the control rods from the control rod drive mechanisms;

lifting the vessel head upwards from the reactor pressure vessel such that the control rods slide therethrough to remain stationary relative to the fuel rods to maintain the shutdown state;

monitoring with a monitoring unit for identifying whether a at least one control rod of the control rods is lifting with the vessel head during the lifting of the head to open the pressure vessel; and terminating, with a control system linked to the monitoring unit, the lifting of the vessel head when the monitoring unit identifies the at least one control rod is being lifted with the vessel head.

15. The method of claim 14, wherein terminating the lifting of the vessel head includes returning the vessel head to the reactor pressure vessel if the control rod is monitored to be lifted with the head.

16. The method of claim 14, wherein monitoring for identifying whether the control rod is lifted with the vessel head includes detecting the positions of the control rods relative to the vessel head, and comparing a rate of lift of the vessel head with the rates of change of the detected positions of the control rods relative to the head to identify from the detected positions the at least one control rod has been lifted with the vessel head.

17. The method of claim 14, wherein the vessel head and any other components of the reactor lifted with the head form a reactor head package, and the monitoring step includes measuring a weight of the reactor head package to identify whether the at least one control rod has been lifted with the vessel head.

18. The method of claim 14, wherein the monitoring for whether the control rod is lifting with the vessel head includes measuring neutron population to identify whether the at least one control rod has been lifted with the vessel head.

* * * * *